(12) United States Patent
Lipka et al.

(10) Patent No.: US 10,948,295 B2
(45) Date of Patent: Mar. 16, 2021

(54) AUTO PHASE CONTROL DRIVE CIRCUIT FOR GYROSCOPE APPARATUS

(71) Applicant: PANASONIC INTELLECTUAL PROPERTY MANAGEMENT CO., LTD., Osaka (JP)

(72) Inventors: Ronald Joseph Lipka, Northborough, MA (US); Hong Xiao, Westborough, MA (US)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 192 days.

(21) Appl. No.: 16/369,264

(22) Filed: Mar. 29, 2019

(65) Prior Publication Data
US 2020/0309528 A1  Oct. 1, 2020

(51) Int. Cl.
*G01C 19/5776* (2012.01)
(52) U.S. Cl.
CPC .................. *G01C 19/5776* (2013.01)
(58) Field of Classification Search
CPC ............ G01C 19/5614; G01C 19/5649; G01C 19/567; G01C 19/5726; G01C 19/5776
See application file for complete search history.

(56) References Cited

U.S. PATENT DOCUMENTS

2010/0149721 A1*  6/2010  Prandi ................ G01C 19/5755
361/277
2010/0315170 A1* 12/2010  Locascio .................. H03H 9/25
331/15

FOREIGN PATENT DOCUMENTS

JP       5369525 B2    9/2013

* cited by examiner

*Primary Examiner* — Benjamin R Schmitt
(74) *Attorney, Agent, or Firm* — Westerman, Hattori, Daniels & Adrian, LLP

(57) ABSTRACT

An auto phase control drive circuit for a gyroscope apparatus is disclosed. The gyroscope apparatus has a gyro resonator, and the circuit comprises a first circuit and a second circuit. The first circuit includes a first electrode configured to face the gyro resonator, a first amplifier configured to be electrically connected with the first electrode and output a first signal, a variable capacitor electrically connected with the first amplifier, a second electrode configured to face the gyro resonator, to receive a second signal and to be electrically connected with the variable capacitor. The second circuit is configured to be electrically connected with the first circuit and to change a capacitance of the variable capacitor of the first circuit based on the first signal and the second signal to decrease a phase difference between the first signal and the second signal.

6 Claims, 2 Drawing Sheets

AUTO PHASE CONTROL DRIVE CIRCUIT FOR GYROSCOPE APPARATUS

BACKGROUND

Field of the Invention

At least one example embodiment relates to a drive circuit for a gyroscope apparatus, and more particularly, the drive circuit for a gyroscope apparatus having a phase controller to correct phase errors.

Description of the Related Art

Japanese Patent No. 5369525B2 discloses an example of a conventional drive circuit for a gyroscope apparatus. The conventional drive circuit for a gyroscope apparatus has a pair of electrodes and a plurality of electronic parts, such as amplifiers, capacitors, and resistors. These electronic parts are connected between two electrodes. Here, the drive circuit is configured to drive a voltage onto a drive electrode, measure the received signal (response of the gyroscope to this drive voltage) at a pick-off electrode, and provide the necessary amplification and phase adjustment between these two electrodes for a feedback loop to sustain oscillation at a gyroscope resonance frequency.

Ideally, it is preferred that the phase of the drive signal and the phase of the pick-off signal are the same. However, a phase difference between the pick-off signal and the drive signal occurs due to the resistance, the capacitance, or the inductance of these electrical parts. Furthermore, these electronic parts tend to change their electrical characteristics, such as capacitance, inductance, and resistance, depending on environment variations such as temperature, humidity, pressure, etc. As a result, the phase difference between the pick-off signal and the drive signal may shift.

Nowadays, the gyroscope apparatuses are currently being used in many products. For example, gyroscope apparatuses are used in smart phones, navigation systems, cars, etc. Therefore, there is a strong need to have a drive circuit for the gyroscope apparatus capable of suppressing the phase differences between the pick-off signal and the drive signal to improve the detection accuracy even if the environments changes.

SUMMARY

According to an aspect, there is provided an auto phase control drive circuit for a gyroscope apparatus having a gyro resonator. The auto phase control drive circuit may include a first circuit and a second circuit.

The first circuit includes a first electrode configured to face the gyro resonator, a first amplifier configured to be electrically connected with the first electrode and output a first signal, a variable capacitor electrically connected with the first amplifier, a second electrode configured to face the gyro resonator, to receive a second signal and to be electrically connected with the variable capacitor.

The second circuit is configured to be electrically connected with the first circuit and to change a capacitance of the variable capacitor of the first circuit based on the first signal and the second signal to decrease a phase difference between the first signal and the second signal.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
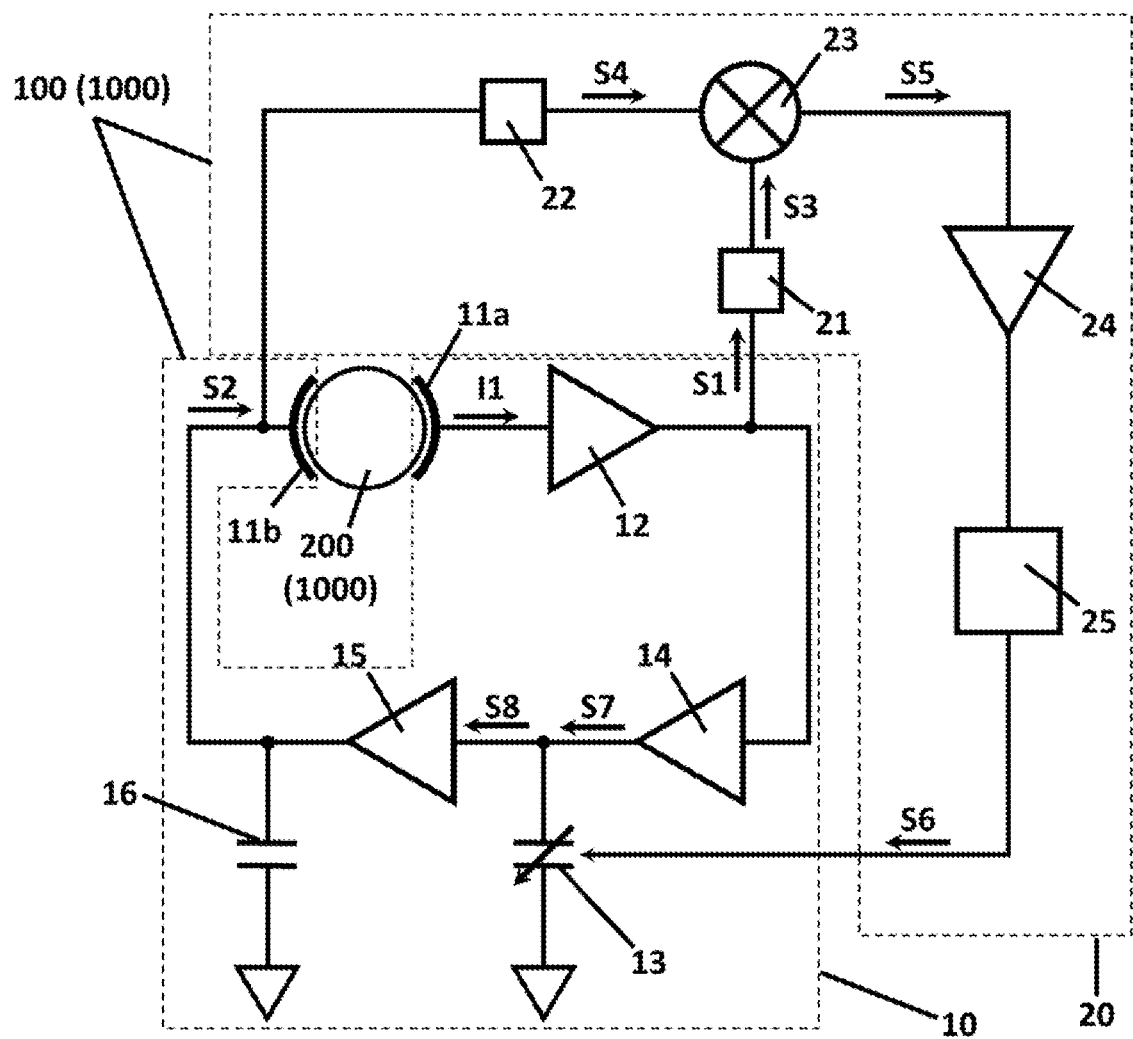
FIG. 1 illustrates an example of a gyroscope apparatus having an auto phase control drive circuit in accordance with an embodiment of the present invention.

The following structural or functional descriptions of example embodiments described herein are merely intended for the purpose of describing the example embodiments described herein and may be implemented in various forms. Here, the example embodiments are not construed as limited to the disclosure and should be understood to include all changes, equivalents, and replacements within the technical idea of the present disclosure.

Hereinafter, example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

FIG. 1 illustrates an example of a gyroscope apparatus having an auto phase control drive circuit. Referring to FIG. 1, the gyroscope apparatus 1000 includes the auto phase control drive circuit 100 and a gyro resonator 200.

The auto phase control drive circuit 100 includes a first circuit 10 (as a drive circuit) and a second circuit 20 (as a phase corrector circuit). The first circuit 10 includes a first electrode 11a (as a pick-off electrode), an amplifier 12, a second electrode 11b (as a drive electrode), and a variable capacitor 13. The first electrode 11a and the second electrode 11b are configured to face the gyro resonator 200.

The amplifier 12 is electrically connected with the first electrode 11a. The amplifier 12 outputs a signal S1. The second electrode 11b is electrically connected with the amplifier 12. And the second electrode 11b receives a signal S2. The variable capacitor 13 is connected between the amplifier 12 and the second electrode 11b.

The second circuit 20 is configured to change a capacitance of the variable capacitor 13 based on the signal S1 and the signal S2. And the second circuit 20 decreases a phase difference between the signal S1 and the signal S2.

As described above, the auto phase control drive circuit 100 is configured to change the capacitance of the variable capacitor 13 to decrease a phase difference between the signal S1 and the signal S2 by the second circuit 20. The second circuit 20 changes the capacitance of the variable capacitor 13 based on the signal S1 and the signal S2.

The auto phase control drive circuit 100 adjusts the phase of the signal S1 and the phase of the signal S2 close to each other, even if the phase of the signal S1 and phase of the signal S2 are shifted due to the influence of changing environment. Therefore, the auto phase control drive circuit 100 can suppress an increase of the phase differences due to the changing of the environment.

Hereinafter, the auto phase control drive circuit 100 is described in more details with reference to FIG. 1. The auto phase control drive circuit 100 includes a first circuit 10 and a second circuit 20. The first circuit 10 includes a first electrode 11a, a second electrode 11b, amplifiers 12, 14, 15, a variable capacitor 13 and a capacitor 16.

The first electrode 11a is configured to be capacitively coupled with the gyro resonator 200. The first electrode 11a outputs a drive current I1.

The amplifier 12 is electrically connected with the first electrode 11a, and the amplifier 12 receives the drive current I1 from the first electrode 11a. The amplifier 12 converts the drive current I1 to a signal S1 as a voltage signal. The amplifier 12 may preferably be a transimpedance amplifier.

The amplifier 14 is electrically connected with the amplifier 12, and the amplifier 14 receives the signal S1 from the amplifier 12. The amplifier 14 adjusts an amplitude of the signal S1 to be constant and outputs a signal S7. The amplifier 14 may preferably be a variable gain amplifier.

The amplifier 15 is electrically connected with the amplifier 14. The amplifier 15 amplifies the voltage of a signal S8, which is converted from the signal S7 by the variable capacitor 13. The amplifier 15 may preferably be a drive amplifier.

The variable capacitor 13 is electrically connected at a point located between the amplifier 14 and the amplifier 15. The variable capacitor 13 is electrically connected to ground. The variable capacitor 13 is configured to be electrically connected with the second circuit 20, where its capacitance is changed by a signal S6 from the second circuit 20. The variable capacitor 13 leads the phase of the signal S7 and outputs the signal S8. The variable capacitor 13 changes the capacitance according to the voltage of the signal S6. For example, the variable capacitor 13 has a regular relationship, such as proportional or inverse proportional relationship, between the voltage of the signal S6 and the capacitance of the variable capacitor 13. A variable inductor may be used in place of the variable capacitor 13.

The second electrode 11b is electrically connected with the amplifier 15. The second electrode 11b is configured to be capacitively coupled with a gyro resonator 200 and apply a voltage of the signal S2 to the gyro resonator 200.

The capacitor 16 is electrically connected at a point located between the amplifier 15 and the second electrode 11b. The signal S8 is converted to the signal S2 by the amplifier 15 and the capacitor 16.

The first circuit 20 includes a first phase changer 21, a second phase changer 22, a multiplier 23, an amplifier 24, and a filter 25.

The first phase changer 21 is electrically connected between the amplifier 12 and the amplifier 14. The first phase changer 21 receives the signal S1 from the amplifier 12. The first phase changer 21 changes a phase of the signal S1. And the first phase changer 21 outputs a signal S3. Preferably, the first phase changer 21 inverts the phase by −45 degrees.

The second phase changer 22 is electrically connected between the capacitor 16 and the second electrode 11b, and the second phase changer 22 receives the signal S2 from the capacitor 16. The second phase changer 22 changes the phase of the signal S2. Preferably, the second phase changer 22 inverts the phase by 45 degrees.

The multiplier 23 is electrically connected with the first phase changer 21 and the second phase changer 22. The multiplier 23 receives the signal S3 and the signal S4, and the multiplier 23 detects the phase difference between the signal S3 and the signal S4. The multiplier 23 outputs a signal S5 generated based on the signal S1 and the signal S2 (especially, based on the phase difference between the S3 and the signal S4) for adjusting the phase differences between the signal S1 and the signal S2.

Preferably, the multiplier 23 is configured to output the signal S5 to adjust the voltage of the signal S6, which adjusts the variable capacitor 13 to adjust the phase between the signal S7 and the signal S8. In the other word, the voltage of the signal S6 affects the capacitance of the variable capacitor 13. The phase between the signal S1 and the signal S2 is adjusted by the variable capacitor 13.

The multiplier 23 is configured to generate a mostly flat signal (direct current signal). In most cases, the signal S5 generated by the multiplier 23 contains a small ripple. If multiplier 23 outputs the signal S5 with a negligible ripple amount, the multiplier 23 can directly output the signal S5 to the variable capacitor 13.

The amplifier 24 is electrically connected with the multiplier 23 and the filter 25. The amplifier 24 receives the signal S5 and amplifies the ripple of the signal S5. The amplifier 24 can preferably be an error amplifier.

The filter 25 is electrically connected with the amplifier 24 and the variable capacitor 13. The filter 25 receives the signal S5 from the amplifier 24 and removes the amplified ripple of the signal S5. Therefore, the signal S6 is flatter than the signal S5. The filter 25 outputs the signal S6 to the variable capacitor 13. The signal S6 corrects phase differences between the signal S1 and the signal S2.

Figure 2:
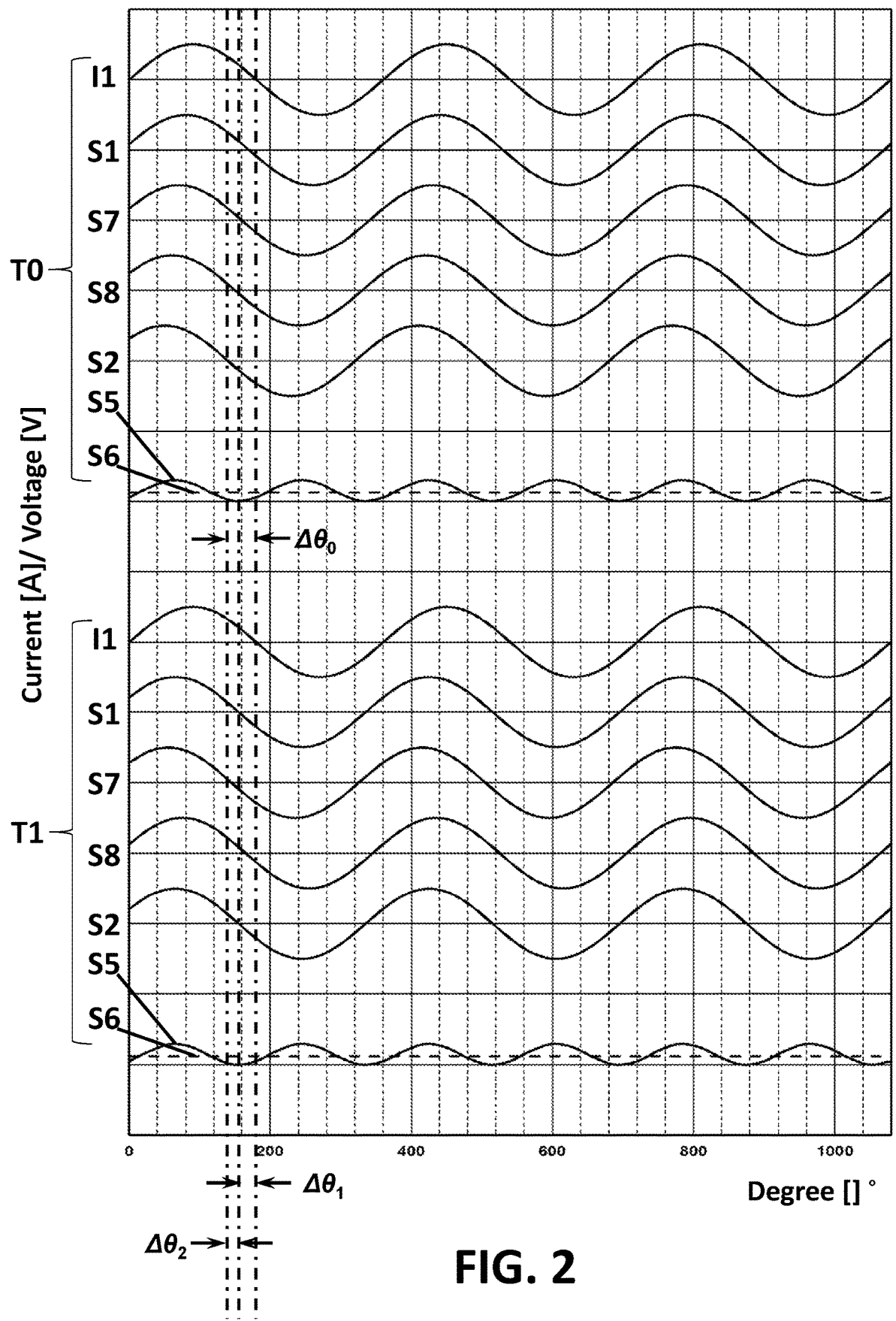
FIG. 2 illustrates a diagram illustrating waveforms of various signals (I1, S1, S2, S5, S6, S7 and S8) in the auto phase control drive circuit shown in FIG. 1.

FIG. 2 illustrates a diagram illustrating waveforms of various signals (I1, S1, S2, S5, S6, S7 and S8) in the auto phase control drive circuit shown in FIG. 1. The top diagram illustrates waveforms of various signals when the phase shift has occurred at time T0. The bottom diagram illustrates waveforms of various signals after a lapse of time T1 from the occurrence of the phase shift.

Referring to FIG. 2, the operation of auto phase control drive circuit 100 is described. The drive current I1 outputted from the first electrode 11a is converted to the signal S1 by the amplifier 12. The phase difference is generated between the signal S1 and the drive current I1 due to the phase shift caused by the capacitance in the amplifier 12. However, the phase difference is negligibly small. Thus, the phase of the first signal S1 is almost equal to the phase of the drive current I1.

Here, it is assumed that the phase shift occurs between the signal S1 and the signal S2 caused by the change of environment. Here, the environment indicates ambient conditions around the drive circuit, such as temperature, pressure, humidity, vibration, etc. The time at which the phase shift occurred is T0. At the time T0, the signal S2 has a phase lead by a phase difference $\Delta\theta_0$ with respect to the first signal S1.

The multiplier 23 generates the signal S5 for leading the phase of the signal S7 based on the signal S1 and the signal S2 and outputs the signal S5. Here, for example, a proportional relationship is established between a voltage of the signal S5 and the phase difference. The filter 25 receives the signal S5 from the multiplier 23 via the amplifier 24. The filter 25 removes the ripple from the signal S5 and outputs the signal S6. Here, the ripple of the signal S5 is very small. Thus, the proportional relationship is also established between a voltage of the signal S6 and the phase difference.

The filter 25 outputs the signal S6 to the variable capacitor 13. The variable capacitor 13 changes its capacitance based on the voltage of the signal S6. The variable capacitor 13 leads the signal S1 by Δθ₁ degrees at the time of T1 with respect to the signal S1 at the time of T0. Furthermore, the variable capacitor 13 also lags the signal S2 by Δθ₂ degrees at the time of T1 with respect to the signal S2 at the time of T0.

As a result, the signal S1 shifts to be close with the phase of the signal S2, and the signal S2 also shifts to be close with the phase of the signal S1 so that the phase of S1 and the phase of S2 are eventually the same.

In this way, even if the phase shift occurs between the signal S1 and the signal S2 due to the change of the environment, the second circuit 20 outputs the signal S6 to the variable capacitor 13 to adjust a phase of the signal S1 and the phase of the signal S2.

Inasmuch, the auto phase control drive circuit 100 can follow to correct the phase of the signal S1 and the phase of the signal S2 close to each other, even if the phase of the signal S1 and phase of the signal S2 are shifted due to the influence of changing environment. Therefore, the auto phase control drive circuit 100 can suppress an increase of the phase differences due to the changing of the environment.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

EXPLANATION OF REFERENCE SYMBOLS

10: circuit (first circuit)
11a: first electrode
11b: second electrode
12: amplifier
13: variable capacitor
14: amplifier
15: amplifier
16: capacitor
20: circuit (second circuit)
21: first phase changer
22: second phase changer
23: multiplier
24: amplifier
25: filter
I1: drive current
S1: signal
S2: signal
S3: signal
S4: signal
S5: signal
S6: signal
S7: signal
S8: signal
100: auto phase control drive circuit
200: gyro resonator
1000: gyroscope apparatus

What is claimed is:

1. An auto phase control drive circuit for a gyroscope apparatus, the gyroscope apparatus having a gyro resonator, comprising:
   a first circuit including:
      a first electrode configured to face the gyro resonator;
      a first amplifier configured to be electrically connected with the first electrode and output a first signal;
      a variable capacitor electrically connected with the first amplifier; and
      a second electrode configured to face the gyro resonator and to receive a second signal, the second electrode being electrically connected with the variable capacitor, and
   a second circuit is configured to be electrically connected with the first circuit and to change a capacitance of the variable capacitor of the first circuit based on the first signal and the second signal to decrease a phase difference between the first signal and the second signal.

2. The auto phase control drive circuit for the gyroscope apparatus according to claim 1,
   wherein the second circuit includes:
      a first phase changer which is electrically connected between the first amplifier and the variable capacitor, and outputs a third signal having a different phase from that of the first signal;
      a second phase changer which is electrically connected between the variable capacitor and the second electrode, and outputs a fourth signal having a different phase from that of the second signal; and
      a multiplier which receives the third signal and the fourth signal, and outputs a fifth signal based on the third signal and the fourth signal,
   wherein the variable capacitor changes the capacitance of the variable capacitor based on the fifth signal.

3. The auto phase control drive circuit for the gyroscope apparatus according to claim 2,
   wherein the second circuit further includes:
      a second amplifier electrically connected with the multiplier; and
      a filter electrically connected with the second amplifier and the variable capacitor,
   wherein the fifth signal includes a ripple,
   the filter removes the ripple of the fifth signal and outputs the sixth signal to the variable capacitor, and
   the variable capacitor changes the capacitance of the variable capacitor based on the sixth signal.

4. An auto phase control drive circuit for a gyroscope apparatus, the gyroscope apparatus having a gyro resonator, comprising:
   a first circuit including;
      a first electrode configured to face the gyro resonator;
      a first amplifier configured to be electrically connected with the first electrode and outputs a first signal;
      a variable inductor electrically connected with the first amplifier; and
      a second electrode configured to face the gyro resonator and to receive a second signal, the second electrode being electrically connected with the variable inductor, and
   a second circuit is configured to be electrically connected with the first circuit and to change the inductance of the variable inductor of the first circuit based on the first signal and the second signal to decrease a phase difference between the first signal and the second signal.

5. The auto phase control drive circuit for the gyroscope apparatus according to claim 4,
  wherein the second circuit includes:
    a first phase changer which is electrically connected between the first amplifier and the variable inductor, and outputs a third signal having a different phase from that of the first signal;
    a second phase changer which is electrically connected between the variable inductor and the second electrode, and out puts a fourth signal having a different phase from that of the second signal; and
    a multiplier which receive the third signal and the fourth signal, and outputs a fifth signal based on the third signal and the fourth signal,
  wherein the variable inductor changes the inductance of the variable inductor based on the fifth signal.

6. The auto phase control drive circuit for the gyroscope apparatus according to claim 5,
  wherein the second circuit further includes:
    a second amplifier electrically connected with the multiplier; and
    a filter electrically connected with the second amplifier and the variable inductor;
  wherein the fifth signal includes a ripple,
  the filter removes the ripple of the fifth signal and outputs the sixth signal to the variable inductor, and
  the variable inductor changes the inductance of the variable inductor based on the sixth signal.

* * * * *